United States Patent
Jiang

(10) Patent No.: US 9,215,601 B1
(45) Date of Patent: Dec. 15, 2015

(54) REFERENCE NODE ARRANGEMENT SYSTEM AND METHOD

(71) Applicants: Inventec (Pudong) Technology Corporation, Shanghai (CN); Inventec Corporation, Taipei (TW)

(72) Inventor: Xiao Jiang, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 14/662,941

(22) Filed: Mar. 19, 2015

(30) Foreign Application Priority Data

Dec. 5, 2014 (CN) .......................... 2014 1 0737357

(51) Int. Cl.
*H04W 16/18* (2009.01)
*H04W 16/30* (2009.01)
*H04L 12/24* (2006.01)

(52) U.S. Cl.
CPC ............... *H04W 16/18* (2013.01); *H04L 41/22* (2013.01); *H04W 16/30* (2013.01)

(58) Field of Classification Search
CPC ..... H04W 16/18; H04W 16/30; H04W 16/32; H04W 40/00; H04L 41/22
See application file for complete search history.

(56) References Cited

U.S. PATENT DOCUMENTS

2015/0237480 A1* 8/2015 Fang .................. H04W 64/003
455/456.6

* cited by examiner

*Primary Examiner* — Curtis Odom
(74) *Attorney, Agent, or Firm* — David R. Stevens; Stevens Law Group

(57) ABSTRACT

A reference node arrangement system and method in a ZigBee are disclosed, where a planar diagram is received to be converted into a geometrical graph and the geometrical graph is converted into a composition of a plurality of equilateral hexagons so that an area composed of the plurality of equilateral hexagons covers an area of the geometrical graph, wherein each of the plurality of equilateral hexagons is composed of six equilateral triangles each having apexes having one of the reference nodes disposed thereon and three adjacent ones among the plurality of equilateral hexagons having a same one among the reference nodes is disposed with the gateway.

10 Claims, 4 Drawing Sheets

REFERENCE NODE ARRANGEMENT SYSTEM AND METHOD

CROSS-REFERENCE TO RELATED APPLICATION

This application claims the benefit of the Chinese Patent Application No. 201410737357.8, filed Dec. 5, 2014.

BACKGROUND OF THE RELATED ART

1. Technical Field

The present invention relates to an arrangement system and method, and particularly to a reference node arrangement system and method sued in a ZigBee network environment.

2. Related Art

For recent years, various wireless detection technologies have come up with prevalence and vigorous development of Internet of Things. Among them, ZigBee has won more attraction due to its safety, lower power consumption, and reconfigurable network ability.

Generally, reference nodes have to be arranged at particular points in the ZigBee network environment, and the reference nodes require a number of at least three for a precise positioning of an electronic tag, such as the trilateration method. However, since the conventional reference nodes arrangement is hard to estimate the positions of the reference nodes and the required number with different planar spaces, the issue of inconvenient reference nodes is encountered in the ZigBee network environment arranged in the different planar spaces.

In response, there has been the technology by using a received signal strength indication (RSSI) for the reference nodes arrangement set forth, so that all the reference nodes may entirely cover the planar space. However, this policy requires a repeated detection action for detection of the wireless signal strength so as to locate the positions for arrangement of the reference nodes. When the number of the required reference nodes to be arranged is large, the number of times required for detection of the wireless signal strength also become larger correspondingly, resulting in a larger difficulty of the reference nodes arrangement. Therefore, the inconvenient reference nodes arrangement problem in the ZigBee network environment in different planar spaces.

In view of this, it may be known that there has long been the issue of inconvenient reference nodes arrangement in the ZigBee network environment in different planar spaces, there is quite a need to set forth some improvement means to settle down this problem.

SUMMARY

It is, therefore, an object of the present invention to provide a reference node arrangement system and method used in a ZigBee.

According to the present invention, the reference node arrangement system in the ZigBee comprises a receiving module, receiving a planar diagram; a converting module, converting the planar diagram to a geometrical graph and converting the geometrical graph into a composition of a plurality of equilateral hexagons so that an area composed of the plurality of equilateral hexagons covers an area of the geometrical graph, wherein each of the plurality of equilateral hexagons has a same apex and the plurality of equilateral hexagons are six equilateral triangles adjacent thereto; an arranging module, arranging a reference node on each of a plurality of apexes of the each of the six equilateral triangles so that three adjacent ones among the plurality of equilateral hexagons have a same reference node, and arranging a gateway on the same reference node; and a display module, displaying the arranged reference node on each of a plurality of apexes of each of the six equilateral triangles and the gateway on the planar diagram.

According to the present invention, the reference node arrangement method used in the ZigBee comprises steps of receiving a planar diagram; converting the planar diagram to a geometrical graph and converting the geometrical graph into a composition of a plurality of equilateral hexagons so that an area composed of the plurality of equilateral hexagons covers an area of the geometrical graph, wherein each of the plurality of equilateral hexagons has a same apex and the plurality of equilateral hexagons are six equilateral triangles adjacent thereto; arranging a reference node on each of a plurality of apexes of the each of the six equilateral triangles so that three adjacent ones among the plurality of equilateral hexagons have a same reference node, and arranging a gateway on the same reference node; and displaying the arranged reference node on each of a plurality of apexes of each of the six equilateral triangles and the gateway on the planar diagram.

The system and method of the present invention has the difference as compared to the prior art that the planar diagram is received to be converted into the geometrical graph and the geometrical graph is converted into the composition of the plurality of equilateral hexagons so that the area composed of the plurality of equilateral hexagons covers the area of the geometrical graph, wherein each of the plurality of equilateral hexagons is composed of six equilateral triangles each having apexes having the reference node disposed thereon and three adjacent ones among the plurality of equilateral hexagons having a same reference node is disposed with the gateway.

By using the above technical means, the present invention may achieve in the technical efficacy of a convenient enhancement of reference node arrangement in ZigBee network environment.

BRIEF DESCRIPTION OF THE DRAWINGS

The present invention will be better understood from the following detailed descriptions of the preferred embodiments according to the present invention, taken in conjunction with the accompanying drawings, in which.

DETAILED DESCRIPTION

The present invention will be apparent from the following detailed description, which proceeds with reference to the accompanying drawings, wherein the same references relate to the same elements.

Prior to the description of a reference node arrangement system and method of the present invention, an environment where the present invention is applied onto is first described. The present invention is applied on a ZigBee network environment, which has a positioning manner by using a beacon of IEEE 802.15.4 and a three point positioning method.

Figure 1:
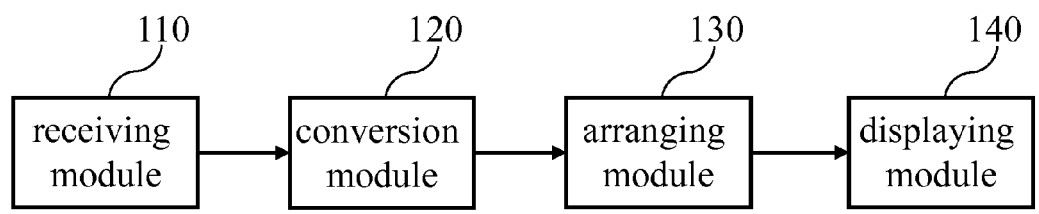
FIG. 1 is a system block diagram of a reference node arrangement system in a ZigBee according to the present invention.

In the following, the reference node arrangement system and method used in the ZigBee are described in details with reference to figures. Referring first to FIG. 1, which is a system block diagram of a reference node arrangement system in a ZigBee according to the present invention, the system comprises a receiving module 110, a conversion module 120, an arranging module 130, and a displaying module 140.

The receiving module 110 is used to receive a planar diagram, which is a spacious planar diagram where the ZigBee network environment is to be arranged thereon. In real implementation, the planar diagram is a graphic file which may be processed by a computer, and may be received through a load-in manner by the receiving module 110.

The conversion module 120 is used to convert the planar diagram into a geometrical graph and then into a composition of a plurality equilateral hexagons, so that an area formed by the equilateral hexagons covers an area formed by the geometrical graph. Furthermore, each of the equilateral hexagons has the same apex and is composed of six adjacent equilateral triangles. Since the planar diagram is not a geometrical graph, the conversion module 120 will convert first the planar diagram into the geometrical graph to facilitate the conversion task. In addition, the converted geometrical graph may be presented by using a vector diagram. After the geometrical graph is successfully obtained, a plurality of equilateral hexagons not overlapping with one another may be produced to cover sufficiently the geometrical graph conveniently.

The arrangement module 130 is used to arrange a reference node at each of apexes of each of the equilateral triangles, and a gateway is further arranged at the same reference node among three adjacent trilateral hexagons. In real implementation, these equilateral triangles each have their sides each smaller than 15 m, the reference node is a ZigBee router having a radiation range larger than 15 m, and the gateway is a Wi-Fi router.

The displaying module 140 is used to arrange the reference nodes and the gateway on the planar diagram. In real implementation, a distance of the sides of the equilateral triangles is displayed simultaneously, respectively when these sides are displayed, wherein the distance may be presented in a particular scale.

Figure 2:
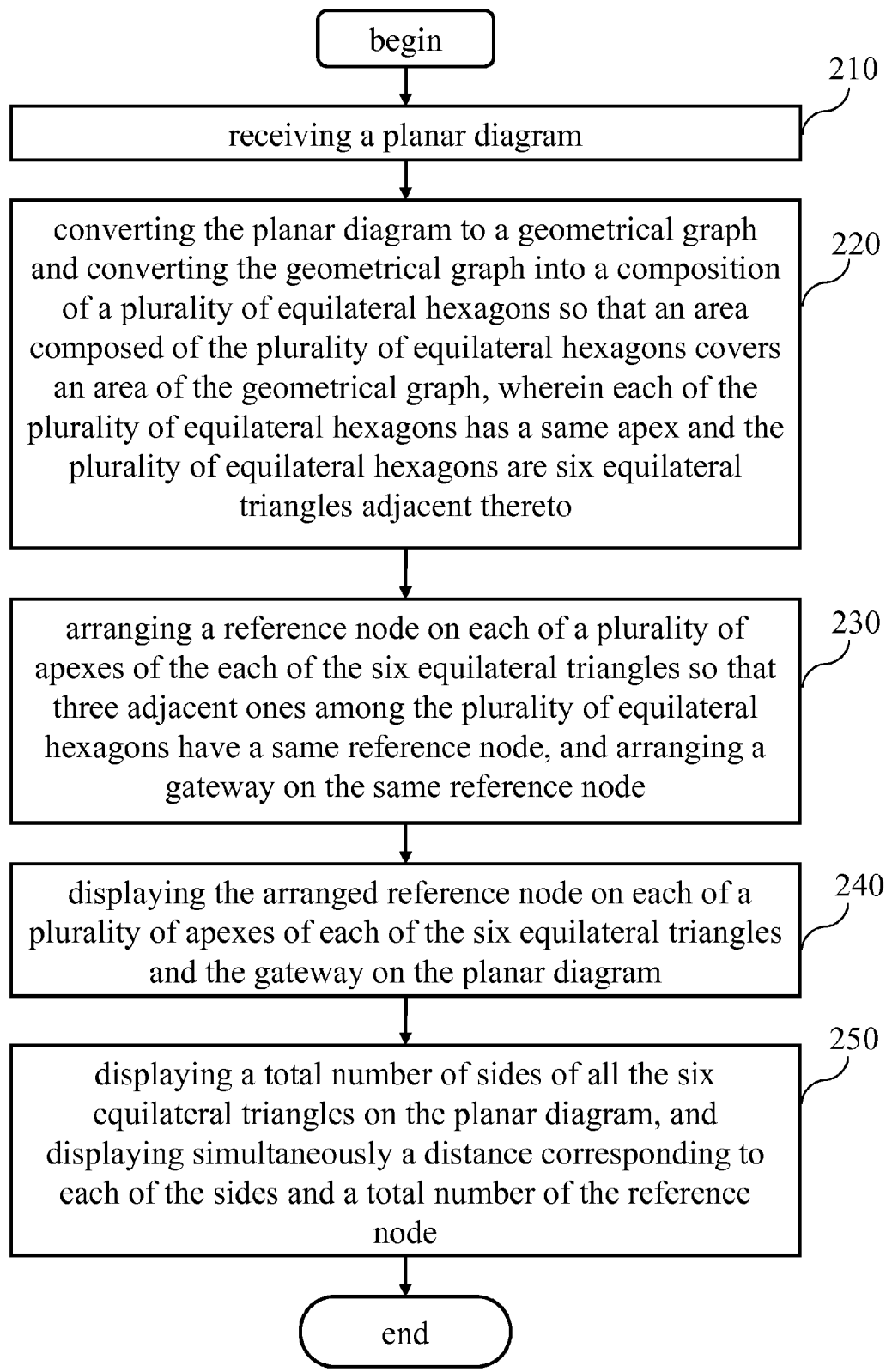
FIG. 2 is a system block diagram of a reference node arrangement system in a ZigBee according to the present invention.

Thereafter, referring to FIG. 2, which is a reference node arrangement method used in the ZigBee, the method comprises the following steps. At first, a planar diagram is received (Step 210). Next, the planar diagram is converted into a geometrical graph and the geometrical graph is then converted into a composition of a plurality of equilateral hexagons, so that an area composed of the plurality of equilateral hexagons covers an area of the geometrical graph, wherein each of the plurality of equilateral hexagons has a same apex and the plurality of equilateral hexagons are six equilateral triangles adjacent thereto (Step 220). Subsequently, a reference node is arranged on each of a plurality of apexes of the each of the six equilateral triangles so that three adjacent ones among the plurality of equilateral hexagons have a same reference node, and arranging a gateway on the same reference node (Step 230). Finally, the arranged reference node is displayed on each of a plurality of apexes of each of the six equilateral triangles and the gateway on the planar diagram (Step 240).

By means of the above steps, the planar diagram is received to be converted into the geometrical graph and the geometrical graph is converted into the composition of a plurality of equilateral hexagons so that the area composed of the plurality of equilateral hexagons covers the area of the geometrical graph, wherein each of the plurality of equilateral hexagons is composed of the six equilateral triangles each having apexes having one of the reference nodes disposed thereon and three adjacent ones among the plurality of equilateral hexagons having a same one among the reference nodes is disposed with the gateway.

After step 240, a step of displaying the three sides of each of the plurality of equilateral triangles and a distance corresponding thereto, and a total number of the reference node may be displayed (Step 250) may be introduced. In this manner, an arrangement may be made by the user according directly to the displayed distance and the total number of the reference nodes may be displayed.

Figure 3:
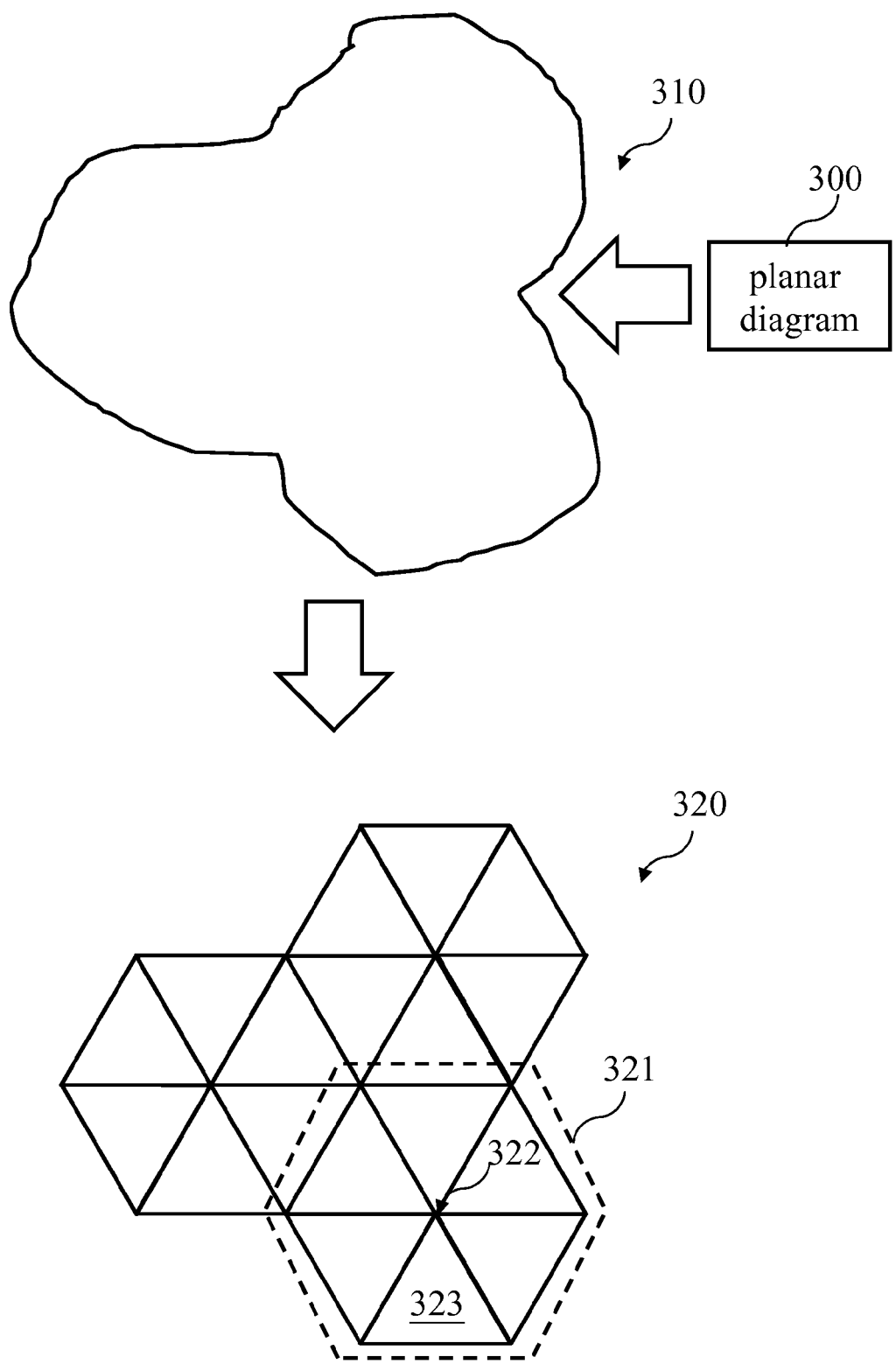
FIG. 3 is a schematic diagram for illustrating a conversion of a planar diagram used in the present invention.
Figure 4:
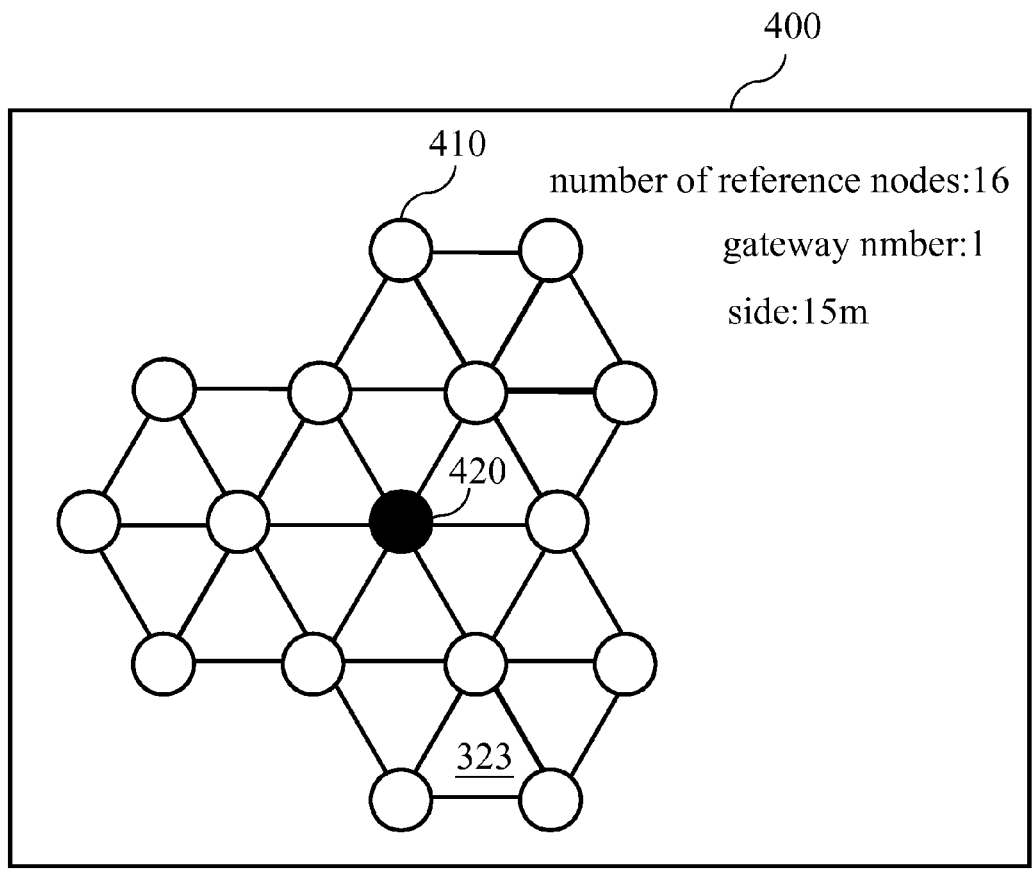
FIG. 4 is a schematic diagram for illustrating an arrangement of reference nodes and a gateway used in the present invention.

The present invention will be further explained via an embodiment with reference to FIG. 3 and FIG. 4, in which FIG. 3 is a schematic diagram for illustrating a planar diagram is used in the present invention. Referring first to FIG. 3, after the receiving module 110 receives the planar diagram 300 in real implementation, the conversion module 120 will convert the planar diagram 300 into the geometrical graph 310, and then convert the geometrical graph 310 into a graph 320 composed of a plurality of equilateral hexagons, wherein each of the equilateral hexagons 321 is composed of six adjacent equilateral triangles 323 having the same apex. In this example, the area of the graph 320 may be allowed to be slightly larger or smaller then the area of the geometrical graph 310. Since the reference nodes emit their signals in all directions, the graph 320 generally has its area slightly smaller than that of the graph 310.

As shown in FIG. 4, a schematic diagram for illustrating an arrangement of reference nodes and a gateway used in the present invention is shown. In real implementation, each of the equilateral triangles 323 has a reference node 410 arranged on each of the apexes thereof, and a gateway 420, i.e. the Wi-Fi reference node, is arranged on the same reference node among three adjacent equilateral hexagons. Thereafter, the displaying module 140 may display the above arrangement through a display frame 400, and a distance, such as 15 m, of the sides of the equilateral triangles and a number of the reference nodes 410 (the gateway is also one of the reference nodes), such as 16, may be displayed simultaneously. Even more, a bright color may be added on the reference nodes acting as the gateway 420. In this manner, an arranger may know the arrangement of the reference nodes 410 according to the display frame 400, and how to select one of the reference nodes to be the gateway. As such, the arrangement of the reference nodes in the ZigBee network environment may be undertaken more conveniently.

In view of the above, the system and method of the present invention has the difference as compared to the prior art that the planar diagram is received to be converted into the geometrical graph and the geometrical graph is converted into the composition of the plurality of equilateral hexagons so that the area composed of the plurality of equilateral hexagons covers the area of the geometrical graph, wherein each of the plurality of equilateral hexagons is composed of six equilateral triangles each having apexes having the reference node disposed thereon and three adjacent ones among the plurality of equilateral hexagons having a same reference node is disposed with the gateway. By using the above technical means, the present invention may well overcome the problem existing in the prior art and achieve in the technical efficacy of a convenient enhancement of reference node arrangement in ZigBee network environment.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A reference node arrangement system used in a ZigBee, comprising:
- a receiving module, receiving a planar diagram;
- a converting module, converting the planar diagram to a geometrical graph and converting the geometrical graph into a composition of a plurality of equilateral hexagons so that an area composed of the plurality of equilateral hexagons covers an area of the geometrical graph, wherein each of the plurality of equilateral hexagons has a same apex and the plurality of equilateral hexagons are six equilateral triangles adjacent thereto;
- an arranging module, arranging a reference node on each of a plurality of apexes of the each of the six equilateral triangles so that three adjacent ones among the plurality of equilateral hexagons have a same reference node, and arranging a gateway on the same reference node; and
- a display module, displaying the arranged reference node on each of a plurality of apexes of each of the six equilateral triangles and the gateway on the planar diagram.

2. The reference node arrangement system used in a ZigBee as claimed in claim 1, wherein each of the plurality of equilateral triangles has three sides each being smaller than 15 m.

3. The reference node arrangement system used in a ZigBee as claimed in claim 1, wherein the gateway is a Wi-Fi router.

4. The reference node arrangement system used in a ZigBee as claimed in claim 1, wherein the reference node is a ZigBee router and has a radiation range larger than 15 m.

5. The reference node arrangement system used in a ZigBee as claimed in claim 1, wherein the displaying module displays the three sides of each of the plurality of equilateral triangles and a distance corresponding thereto on the planar diagram.

6. A reference node arrangement method used in a ZigBee, comprising steps of:
- receiving a planar diagram;
- converting the planar diagram to a geometrical graph and converting the geometrical graph into a composition of a plurality of equilateral hexagons so that an area composed of the plurality of equilateral hexagons covers an area of the geometrical graph, wherein each of the plurality of equilateral hexagons has a same apex and the plurality of equilateral hexagons are six equilateral triangles adjacent thereto;
- arranging a reference node on each of a plurality of apexes of the each of the six equilateral triangles so that three adjacent ones among the plurality of equilateral hexagons have a same reference node, and arranging a gateway on the same reference node; and
- displaying the arranged reference node on each of a plurality of apexes of each of the six equilateral triangles and the gateway on the planar diagram.

7. The reference node arrangement method used in the ZigBee as claimed in claim 6, wherein each of the plurality of equilateral triangles has three sides each being smaller than 15 m.

8. The reference node arrangement method used in the ZigBee as claimed in claim 6, wherein the gateway is a Wi-Fi router.

9. The reference node arrangement method used in the ZigBee as claimed in claim 6, wherein the reference node is a ZigBee router and has a radiation range larger than 15 m.

10. The reference node arrangement method used in the ZigBee as claimed in claim 6, further comprising a step of displaying the three sides of each of the plurality of equilateral triangles and a distance corresponding thereto, and a total number of the reference node for all the six equilateral triangles on the planar diagram.

* * * * *